US010851015B2

(12) United States Patent
Peyroux

(10) Patent No.: US 10,851,015 B2
(45) Date of Patent: Dec. 1, 2020

(54) COATED GLASS SHEET

(71) Applicant: AGC GLASS EUROPE, Louvain-la-Neuve (BE)

(72) Inventor: Eugenie Peyroux, Dworp (BE)

(73) Assignee: AGC GLASS EUROPE, Louvain-la-Neuve (BE)

( * ) Notice: Subject to any disclaimer, the term of this patent is extended or adjusted under 35 U.S.C. 154(b) by 0 days.

(21) Appl. No.: 15/771,466

(22) PCT Filed: Oct. 27, 2016

(86) PCT No.: PCT/EP2016/075984
§ 371 (c)(1),
(2) Date: Apr. 27, 2018

(87) PCT Pub. No.: WO2017/072259
PCT Pub. Date: May 4, 2017

(65) Prior Publication Data
US 2018/0319701 A1    Nov. 8, 2018

(30) Foreign Application Priority Data

Oct. 30, 2015    (EP) .................................... 15192341

(51) Int. Cl.
| B32B 15/04 | (2006.01) |
| B32B 17/06 | (2006.01) |
| C03C 17/25 | (2006.01) |

(52) U.S. Cl.
CPC ........ *C03C 17/25* (2013.01); *C03C 2217/213* (2013.01); *C03C 2217/24* (2013.01); *C03C 2217/242* (2013.01); *C03C 2218/113* (2013.01)

(58) Field of Classification Search
USPC .......................... 428/426, 428, 432, 701, 702
See application file for complete search history.

(56) References Cited

U.S. PATENT DOCUMENTS

| 4,799,963 | A | * | 1/1989 | Basil | .................... | C09D 183/04 |
| | | | | | | 106/287.12 |
| 7,694,532 | B1 | * | 4/2010 | Boaz | ....................... | C03B 27/06 |
| | | | | | | 148/570 |
| 8,609,197 | B1 | * | 12/2013 | Remington, Jr. | .. | B65D 23/0835 |
| | | | | | | 427/470 |
| 2008/0268260 | A1 | * | 10/2008 | Varaprasad | ........... | C03C 17/256 |
| | | | | | | 428/429 |
| 2012/0009388 | A1 | * | 1/2012 | Varaprasad | ........... | C03C 17/002 |
| | | | | | | 428/172 |
| 2013/0196140 | A1 | * | 8/2013 | Lewis | ....................... | B32B 3/10 |
| | | | | | | 428/312.6 |
| 2013/0299378 | A1 | * | 11/2013 | Sharma | .............. | B65D 23/0814 |
| | | | | | | 206/524.3 |
| 2014/0034544 | A1 | * | 2/2014 | Chang | .................... | B65D 25/14 |
| | | | | | | 206/524.3 |
| 2014/0120279 | A1 | * | 5/2014 | DeMartino | ............... | A61J 1/00 |
| | | | | | | 428/34.6 |
| 2014/0151370 | A1 | * | 6/2014 | Chang | ..................... | A61J 1/065 |
| | | | | | | 220/62.15 |

FOREIGN PATENT DOCUMENTS

| CN | 102105412 A | 6/2011 |
| JP | 295834/97 | 11/1997 |
| JP | 316885/98 | 12/1998 |
| JP | 200158851 | 3/2001 |
| JP | 2012148950 | 8/2012 |
| WO | WO 2008/028815 A1 | 3/2008 |
| WO | WO 2010/003035 A1 | 1/2010 |

OTHER PUBLICATIONS

International Search Report dated Dec. 9, 2016 in PCT/EP2016/075984 filed Oct. 27, 2016.
English Translation only of Japanese Office Action issued in corresponding Japanese application No. 2028-521363 dated Jul. 10, 2020.

* cited by examiner

*Primary Examiner* — Lauren R Colgan
(74) *Attorney, Agent, or Firm* — Oblon, McClelland, Maier & Neustadt, L.L.P.

(57) ABSTRACT

The present invention concerns a process to increase the mechanical and chemical resistance of a hydrolyzable network-forming silica gel coating provided on the surface of a substrate. According to the invention, a coating composition comprising a hydrolyzable, network-forming silica gel doped with a precursor of bismuth or cerium oxide is applied on the surface of the substrate. The present invention concerns also the product obtained by the said process.

16 Claims, No Drawings

COATED GLASS SHEET

TECHNICAL DOMAIN OF THE INVENTION

The invention relates to a process for making a product with an increased mechanical and chemical resistance surface by coating the surface with an improved material and to products obtained by said process. Particularly, the present invention relates also to a heat treated coated glass sheet, in particular glass sheet with a coating formed on a surface thereof, and to such glass sheet which is heat treatable with an increased mechanical and chemical resistance surface properties and which may be handled after such heat treatment.

BACKGROUND OF THE INVENTION

It is generally known to provide objects with a hydrolyzable network-forming silica gel coating. Such a coating is generally associated to a particular property such as coloration to give a requested color to the object, an anti-scratching property to prevent the object from scratches which are not aesthetic, an anti-reflecting coating to decrease the reflection and increase the light transmission, a coating to regulated the refraction index of the object and hydrophobic coating . . . . However, these coatings are often not long-lasting and are often sensitive to mechanical and chemical stresses. Thus, generally a further coating is applied under or over the first coating in order to protect it against mechanical and chemical stresses and to increase the lifetime of the first coating.

Furthermore, more and more heat treated glass as tempered glass are requested in buildings and automotives for safety purposes.

Most of glass sheets for architectural use and for automotive use are made of tempered glass, which has held compressive stress applied to surfaces thereof to improve resistance to tensile stress. As a result of its safety and strength, tempered glass is used in a variety of demanding applications, including windows, shower doors, architectural glass doors and tables, refrigerator trays, as a component of bulletproof glass, for diving masks, and various types of plates and cookware.

Thus, for certain applications, safety reasons require the use of tempered glass. Moreover, for an aesthetic and easy-care point of view, the easy-to-clean property is expected by the end user. The best easy-to clean surfaces are often hydrophobic coatings.

Thus, there is a need to find a simple and a low-cost method of producing a substrate and particularly glass substrate having on at least one of its surface a hydrolyzable network-forming silica gel coating resistant to mechanical and chemical stress.

SUMMARY OF THE INVENTION

One object of the invention is therefore to provide a method to increase the mechanical and chemical resistance of a hydrolyzable network-forming silica gel coating provided on the surface of a substrate. The chemical resistance is namely the resistance to acidic and basic conditions and the mechanical resistance is namely the abrasion resistance.

Another object of the present invention is to provide a substrate and particularly a glass substrate having a long-lasting coating by increasing the chemical and mechanical resistance.

According to the invention, objectives are reached through a coating composition comprising a hydrolyzable, network-forming silica gel doped with a precursor of bismuth or cerium oxide which is applied on at least one of the surfaces of the substrate.

Hydrolysable network-forming silica gel coating has in the frame of the present invention its general meaning, i.e. the silica gel coating is obtained by the sol gel chemistry starting mainly from known silica hydrolysable precursors. Suitable silica hydrolysable precursors are for instance tetraethylorthosilicate, methyltriethoxysilane, methyltrimethoxysilane and the like. According to the present invention, the improved hydrolyzable, network-forming silica gel coating comprises:
  a solvent, (or a mixture of solvents),
  a precursor of bismuth or cerium oxide, under metal salts form or under organometallic form like metal alkoxide (ex: bismuth nitrate, bismuth chloride, cerium nitrate),
  at least one silicon alkoxide,
  optionally other metal alkoxides where the metal could be zirconium, titanium, aluminium, . . .
  optionally a catalyst can be added and
  water.

As alkoxides, methoxide, ethoxide, isopropoxide, butoxide or the like can be used. More specifically, the following silicon alkoxides: tetramethoxysilane, tetraethoxysilane, and methyltriethoxysilane or the like can be used.

Preferably, the solvent is ethanol or isopropanol or ethoxy-ethanol. It is understood that other solvents usually used in sol-gel composition could be used.

Preferably, the alkoxide is the tetraethyl orthosilicate or tetraethoxysilane, commonly known as TEOS. According to the invention, the total quantity of $SiO_2$ expressed as solid dry extract is comprised between 0.5 and 10 wt % from liquid sol-gel composition described above.

According to the present invention, a precursor of bismuth or cerium oxides is bismuth nitrate, bismuth chloride or cerium nitrate, cerium acetate. Other suitable precursors are bismuth citrate, bismuth acetate, bismuth phosphate, cerium chloride, cerium sulfate, cerium acetylacetonate and the like. Certain species may also exist under their hydrates forms which are also included. Preferably, the precursor of bismuth oxide is bismuth nitrate and the precursor of cerium oxide is a cerium nitrate.

According to one embodiment of the present invention, the coating composition may comprise a mixture of the precursors of bismuth and cerium.

Thus, the present invention proposes a uniform resistant coating or a coating on a product can be obtained by providing the surface of said product with a layer which comprises a silica oxide network matrix doped with precursors of bismuth or cerium oxides uniformly distributed therein. The coating provides increased chemical and mechanical resistance compared to non-doped coatings. The presence of cerium or bismuth in the coating composition advantageously improves the chemical and mechanical performances of a substrate coated with it. Bismuth doping presents performances even better than cerium.

This layer is usually a uniform layer of a coherent silica oxide network spread out in sheet-like manner. The doped silica oxide networks of the invention can have open or closed pore. The doped silica oxide layers of the invention are formed by heating an applied gel layer and remain on the product as a solid coating.

The gels used according to the invention are, in particular, silica oxide gels prepared by a sol-gel process. The gels are formed in situ during application to the article or product to be coated, giving rise to a uniform, continuous gel network on the surface of the object to be coated. The silica metal oxide according to the invention is $SiO_2$. The silica oxide may be mixed with 0.1 to 3% in total weight of the coating composition of a metal oxide chosen amongst: $Al_2O_3$, $Fe_2O_3$, $SnO_2$, $ZrO_2$, and/or $TiO_2$. In other words, the coating composition comprises, in a content expressed in weight percent (or percentages by total weight) of the coating, 0.1 to 3% of said metal oxide. By chosen amongst $Al_2O_3$, $Fe_2O_3$, $SnO_2$, $ZrO_2$, and/or $TiO_2$ is meant $Al_2O_3$, $Fe_2O_3$, $SnO_2$, $ZrO_2$, $TiO_2$ or any mixture of those.

According to the invention, the coating composition comprises, in a content expressed as percentages by total weight of the coating, 0.4 to 5% of precursor of bismuth or cerium oxides.

According to another embodiment the invention, the coating composition comprises, in a content expressed as percentages by total weight of the coating, 0.4 to 5% of precursor of bismuth or cerium oxides.

According to another embodiment of the invention, a hydrophobic substance can be added to the coating composition. Furthermore, the addition, according to the invention, of a hydrophobic substance to the sol mixture before or during gel formation ensures that the hydrophobic substance will be uniformly distributed in the entire volume of the forming gel network and that it will be chemically bound by polycondensation, for example to the silanol group thereof. In this manner, thanks to the silica gel network doped with precursor of bismuth or cerium oxides, it had been possible to confer to the surface thus treated pronounced abrasion-resistant and durable soil-repellent properties.

Suitable as hydrophobic substances are generally those hydrophobic substances that can be incorporated into the forming gel. For the process of the invention, it is preferred to use hydrophobic substances capable of distributing themselves very uniformly in the gel-forming sol solution. The hydrophobic substances used in the process of the invention are thus preferably in themselves slightly soluble in the solvent used in the sol-gel or by hydrolysis. Examples of such substances are natural and synthetic oils and/or long-chain fatty acids, preferably fatty acids with a chain of at least six carbon atoms and particularly at least ten carbon atoms. Particularly preferred, however, are hydrophobic substances and, in particular, silanes, siloxanes, and silicone.

Optionally, the humidity resistance may be further increased with addition of zirconium or aluminum. It can particularly be increased by the addition of zirconium salts or alkoxides or aluminum salts or alkoxides.

The coating according to the present invention is transparent and can be deposit by the different usual techniques for the sol-gel application. However, the coating may be colored by adding coloring components. Suitable coloring components may be inorganic or organic pigments or organic dyes.

Metal alkoxide and silicon alkoxide comprised in the coating composition can be hydrolyzed by stirring with water, a catalyst for hydrolysis and a solvent such as alcohol, and then by standing for a given time. As the catalyst, an inorganic acid such as hydrochloric acid, nitric acid and sulfuric acid, or an organic acid such as acetic acid and citric acid can be introduced. As the solvent, a water-soluble organic solvent represented by alcohol such as methanol, ethanol, isopropanol and butanol, 2-ethoxy-ethanol, 1-methoxy-2-propanol, or ketone such as acetone and methylethylketone can be used as well as water. As the water-soluble organic solvent, there also can be mentioned ethylcellosolve, butylcellosolve, cellosolve acetate, diacetone alcohol, tetrahydrofurfuryl alcohol and mesityl oxide. The mixture of the organic solvent and water also can be used for the solvent. It has been discovered in the frame of the present invention that 2-ethoxy-ethanol, 1-methoxy-2-propanol are preferred solvents for the precursors of bismuth oxide that have a limited solubility in standard sol gel solvents such as ethanol.

A coating of a composition comprising the hydrolyzed compounds is coated on a substrate. The hydrolyzed compound is coated onto the surface of the glass substrate by various coating methods. As the coating method, there can be mentioned a coating method with a spin coater, a roll coater, a spray coater, a curtain coater or the like; a dipping method; a flow coating method; and a printing method such as screen printing, gravure printing, and curved-face printing. The hydrolyzed compound is applied onto the surface of the glass plate so that the layer may have a thickness of 10 nm to 500 nm after drying or heating treatment.

The glass substrate with a coating is dried at a temperature between room temperature and 300° C. before being heated at higher temperature generally for a couple of seconds to several hours. It is preferable that the temperature of heating is selected between 400° C. and 800° C. and preferably between 530° C. and 710° C. in order to temper the glass. Specifically, the heating temperature can be in the range from 500° C. to the softening point of the glass substrate. It is preferable that the heating temperature is in the range from 540° C. to the softening point, more preferably the range of 550° C. to the softening point. Thus, the coated glass sheet could be cut in required size, grinded and washed and after be tempered.

Optionally, an undercoat, such as an anticorrosion coating could also be applied before depositing the coating according to the invention. A such undercoat is preferable for example to prevent the sodium to move from the glass bulk. For example, an undercoated comprising a silicon oxide such as a SiOx type, with x greater than 0, could be deposited by chemical vapor deposition (CVD). Other barrier layers like silicon oxide or silicon nitride could be deposited by chemical vapor deposition (CVD) or physical vapor deposition (PVD). A well-known low-e coating could be also deposited on the surface of the glass.

Low-e coatings are commonly produced by PVD method and used in insulating double or triple glazing. Due to their limited resistance, they are generally positioned on the internal faces of the glazing (those faces facing the inside of the glazing) in order to limit the contact with the external environment and avoid mechanical or chemical degradation of the aesthetical and/or the optical properties. The limited mechanical and/or chemical resistance of the low-e PVD coatings limit their use in simple glazing, for interior or exterior use, or in the case of double or triple glazing in external position, i.e. on the external faces of the glazing.

The coating according the invention advantageously increases the mechanical resistance and/or the chemical resistance of the low-e PVD coating with substantially no impact on the emissivity property of the low-e coating allowing their use on the external faces of the glazing.

According to another aspect of the invention, nanoparticles of $SiO_2$ or $Al_2O_3$ can be added to the coating composition. Preferably, nanoparticles of $SiO_2$ are added to the coating composition. Preferably, nanoparticles are added to the coating composition prior to its deposition on at least one part of the surface of the glass sheet. Thus, several functionalized nanoparticles can be used as for example, hydrophilic or hydrophobic or neutral, in solution or not. The nanoparticles which could be used are for example the following products: Aerosil 200® from Evonik, as hydrophilic $SiO_2$ with a diameter of about 12 nm, Aerosil R972 from Evonik as hydrophobic $SiO_2$ with a diameter of 16 nm, Nanouse CE-20B (CeO2 in solution) from Nissan Chemical, IPA-ST-UP from Nissan Chemical as a neutral $SiO_2$ (size 9/15-40/100 nm) in solution . . . .

Preferably, the added nanoparticles are hydrophobic $SiO_2$ nanoparticles. Indeed, the addition of the hydrophobic $SiO_2$ nanoparticles allows to achieve a super-hydrophobic, with a contact angle above 150°, coating even after annealing. During the contact angle measurement, the droplet does not want to stay on the surface even when we force the deposit of the droplet.

The invention also relates to a substrate and particularly a glass coated with the coating according to the present invention. The coated substrate has increased chemical and mechanical resistance compared to substrates coated with non-doped coatings. The presence of cerium or bismuth in the coating composition applied to the substrate advantageously improves the chemical and mechanical performances of the coated substrate. Bismuth doping presents performances even better than cerium.

A substrate according to the present invention is a glass substrate or plastic substrate or a metal substrate. Preferably, the substrate is a glass sheet substrate. The glass sheet substrate according to the invention comprises on one of its faces a coating according to the invention.

The glass is characterised in that the glass coated with the long-lasting coating can be directly heated without any protection of the coating since the coating according to the invention is resistant at high temperatures.

The coating according to the invention may present different properties such as scratching-resistant, anti-reflective, anti-finger-print, anti-fog, colored . . . . Thus, known coatings may be performed by increasing their chemical and mechanical resistance. In other words, the precursors of bismuth or cerium oxide are compatible with known coatings and can be added to them to improve their chemical and mechanical resistance.

The present invention has particular advantages in relation to heat treatable glass sheets. The term "heat treatable glass sheet" as used herein means that the coated glass sheet is adapted to undergo a bending and/or thermal tempering and/or thermal hardening operation and/or enamel firing and/or other comparable heat treatment process without creating defects (e.g. aesthetical defects in the coating) and having still a good adhesion between the glass sheet and the coating. The term thermal hardening has the same meaning as thermally toughened or thermal toughening. Such heat treatment processes may involve heating or exposing the coated glass sheet to a temperature greater than about 530° C., for example, between 530° C. and 735° C. and more preferably between 530° C. and 710° C. in the atmosphere, for between 2 minutes and 20 minutes, preferably for maximum 15 minutes, depending, inter alia, on the type of oven and on the thickness of the glass sheet. However, a chemical tempering may also be used.

Glass sheets according to present invention, once heat treated, may furthermore advantageously offer better properties to conventional non heat treated glass in terms of adhesion of the coating to the glass, chemical resistance, mechanical resistance.

The term "coating" is used herein equally for a coating composition after any drying or heat treatment, and after heat treatment. It means after drying or after drying and heat treatment.

The term "coating solution" is used herein equally for the composition of the solution of the coating before deposition on the surface of the substrate and before any drying or heat treatment.

In a preferred embodiment, the coating of the invention may be continuous and extend over substantially the whole surface of the glass sheet, i.e. over more than 90% of the surface of the glass sheet, preferably over more than 95% of the surface of the glass sheet.

The glass substrate used may be flat glass, in particular float glass of various thicknesses (between 0.5 and 15 mm, for example); it may be soda lime glass and may be clear, extra-clear, coloured, etched, sand-blasted, patterned or coated glass, or particular compositions for display applications. Glass sheets according to the invention may have a size greater than 1 m×1 m. They may have sizes, known as PLF, of for example 3.21 m×6 m or 3.21 m×5.50 m or 3.21 m×5.10 m or 3.21 m×4.50 m or sizes, known as DLF, of for example 3.21 m×2.50 m or 3.21 m×2.25 m.

According to another embodiment of the present invention, the glass substrate may be borosilicate glass.

Forming a more chemical and mechanical resistant coated glass sheets according to the invention may comprise the following steps:
  providing a glass sheet;
  applying a coating of a composition comprising a hydrolyzable, network-forming silica gel and precursors of bismuth or cerium oxides on a surface of the glass sheet;
  drying the coating at a temperature not exceeding 300° C., preferably not exceeding 250° C., more preferably around 150-200° C., so that the coating is dried, i.e. the major part of the organic solvent is evaporated and the silica network is further cross-linked, and sticks to the glass; this may take around 30 seconds to 20 minutes, preferably 1 to 10 minutes.

Coating may be applied by any method known in the art, for example the processes of roller coating or curtain coating, the spray process or flow process or the dip-coater. The screen printing method may also be used, especially if only portions of the glass sheet have to be coated, or a digital printing method (ink-jet for example). Other application methods are spin coating, gravure printing or curved face printing.

Preferably, a glass sheet according to the invention, once thermally toughened may be used as safety glass in buildings, in accordance with the standard EN12150-1:2000. Preferably, a glass sheet according to the invention, once thermally toughened breaks according to the fragmentation test of standard prEN14-179-1:2001 or EN1863-1:2000.

Preferably, a glass sheet according to the invention, once thermally toughened is used as a shower door, table, screen for display . . . .

Embodiments of the invention will now be further described, by way of examples only, to be compared with comparative examples not in accordance with the invention. For simplification, the description below is made with reference to a glass sheet but it is understood that the coating according to the invention can be applied on every surface intended to have a resistant, mechanical properties, for example in building for shower doors, doors, walls and in the automotive, for the side or windshield or back-lite windows . . . .

The coating obtained according to the present invention is particularly adapted for substrate submitted to aggressive substances or humid environment.

One kind of substrate might be of a shower door wherein, the coating is in contact with different aggressive substances (acid, basic, cleaning products), and in a humid environment. Thus, the coating according to the invention should resist to these daily aggressions. Furthermore, a shower is often cleaned with a sponge or a cloth. The coating according to the invention, should resist to this solicitations (mechanical abrasion). For testing the mechanical resistance of the coating, different tests are possible according to the application.

EXAMPLES

Example 1: Preparation of a Bismuth Doped SiO2 Coating According to the Invention 0.058 g of bismuth nitrate, 1.00 g of acetyl acetone and 18 mL of 2-ethoxy-ethanol are stirred during 30 min. Bismuth nitrate used here is bismuth nitrate pentahydrate. 4.22 g of tetraethylorthesilicate is added and a diluted solution of 0.03 g of glacial acetic acid in 1.00 mL of water is added drop wisely. The resulting solution is kept stirred 18 hours at room temperature to allow hydrolysis and condensation reactions to form a sol-gel. Approximately 2 mL of the solution was then deposited by spin coating on a clean clear glass. The glass was then dried at 160° C. for 12 minutes and then thermally annealed under air for 3.5 min at 650° C.

Example 2: Preparation of a Cerium Doped SiO2 Coating According to the Invention 0.10 g of cerium (III) acetate hydrate is stirred in a mixture of 11.50 g of ethanol and 15.00 g of isopropanol during 30 min. 6.25 g of tetraethylorthosilicate was added. A solution of 0.02 g of nitric acid 1 M, 0.06 g of glacial acetic acid and 1.08 g of water was added drop wisely into the solution. The resulting solution was allowed to stay under stirring during 18 hours. Approximately 2 mL of the solution was then deposited by spin coating on a clean clear glass. The glass was then dried at 160° C. for 12 minutes and then thermally annealed under air for 3 min 30 at 650° C.

Example 3: Preparation of a Bismuth Doped SiO2 Coating According to the Invention and Application on a PVD Low-e Coated Glass Substrate 24.3 g of bismuth nitrate pentahydrate and 100.0 g of acetylacetone are stirred in 1800.0 g of 2-ethoxy-ethanol during 30 min. 422.0 g of tetraethylorthosilicate is added. A solution of 3.0 g of glacial acetic acid and 108.0 g of water is added drop wisely into the solution. The resulting solution is allowed to stay under stirring during 18 hours at room temperature. Approximately 2 mL of the solution is then deposited by spin coating at 1000 rotations per minute on a PVD low-e coated glass substrate (commercially available under the name Planibel AS from AGC). The substrate is then dried at 160° C. for 12 minutes and then thermally annealed under air for 4 min at 670° C.

Example 4: Preparation of a Bismuth Doped SiO2 Coating According to the Invention and Application on a PVD Low-e Coated Glass Substrate 0.81 g of bismuth nitrate pentahydrate and 0.33 g of acetylacetone are stirred in 200.27 g of 2-ethoxy-ethanol during 30 min. 46.87 g of tetraethylorthosilicate is added. A solution of 0.33 g of glacial acetic acid and 12.0 g of water is added drop wisely into the solution. The resulting solution is allowed to stay under stirring during 48 hours at room temperature. Approximately 2 mL of the solution is then deposited by spin coating at 2000 rotations per minute on a PVD low-e coated glass substrate (commercially available under the name Smart 51 from AGC). The substrate is then dried at 160° C. for 12 minutes and then thermally annealed under air for 5 min 30 at 650° C.

Example 5: Preparation of a Cerium Doped SiO2 Coating According to the Invention and Application on a PVD Low-e Coated Glass Substrate 0.074 g of cerium (III) nitrate hexahydrate and 0.066 g of ethylacetoacetate are stirred in 121.66 g of 2-ethoxy-ethanol during 30 min. 20.83 g of tetraethylorthosilicate is added. A solution of 0.018 g of nitric acid 65% wt and 7.20 g of water is added drop wisely into the solution. The resulting solution is allowed to stay under stirring during 48 hours at room temperature. Approximately 2 mL of the solution is then deposited by spin coating at 2000 rotations per minute on a PVD low-e coated glass substrate (commercially available under the name Smart 51 from AGC). The substrate is then dried at 160° C. for 12 minutes and then thermally annealed under air for 5 min 30 at 650° C.

Comparative Example 1: Preparation of a SiO2 Coating 46.8 g of tetraethylorthesilicate is stirred into 200 mL of 2-ethoxy-ethanol during 30 min. 0.33 g of glacial acetic acid in 20 mL of water is added drop wisely. The resulting solution was allowed to stay under stirring during 18 hours. Approximately 2 mL of the solution was then deposited by spin coating on a clean clear glass. The glass was then dried at 160° C. for 12 minutes and the thermally annealed under air for 3 min 30 at 650° C.

Comparative Example 2: Preparation of a SiO2 Coating on PVD Low-e Coated Glass Substrate The solution prepared in the Comparative example 1 is deposited by spin coating at 1000 rotations per minute on a PVD low-e coated glass substrate (commercially available under the name Planibel AS from AGC). The substrate is then dried at 160° C. for 12 minutes and then thermally annealed under air for 4 min at 670° C.

Comparative Example 3: Preparation of a SiO2 Coating 46.3 g of tetraethylorthosilicate is stirred into 200.2 mL of 2-ethoxy-ethanol during 30 min. 0.33 g of glacial acetic acid in 12 mL of water is added drop wisely. The resulting solution is allowed to stay under stirring during 24 hours at room temperature. Approximately 2 mL of the solution is then deposited by spin coating at 2000 rotations per minute on a PVD low-e coated glass substrate (commercially available under the name Smart 51 from AGC). The glass is then dried at 160° C. for 12 minutes and then thermally annealed under air for 5 min 30 at 650° C.

Performance Regarding Mechanical Resistance of Tested Coatings

The coatings prepared in examples 1 and 2 and in the comparative example 1 were subjected to an abrasion test performed with an Elcometer 1720 Abrasion and Washability Tester. The test consisted in scrubbing the coated glass for 500, 1000, 2000 or 3000 cycles with a nylon bristle brush as described in ASTM D2486 standard. The surface is examined in reflexion under lighting. If the appearance of the abraded area is distinguishable, the sample is considered as "ko" meaning not having good mechanical resistance. If there is no difference between the abraded area and the non-abraded area, the coating is considered as "ok" meaning having good mechanical resistance according to the invention. The test results are summarized in Table 1:

TABLE 1 evaluation of abrasion resistance of various doped and non-doped SiO2 coating after n rubbing cycles

| Samples | Doping material | % Dry extract of doping material | 500 cycles | 1000 cycles | 2000 cycles | 3000 cycles |
|---|---|---|---|---|---|---|
| Ex. 1 | Bi | 0.11% | ok | ok | ok | ok |
| Ex. 2 | Ce | 0.15% | ok | ok | ok | ok |
| Comp. Ex 1 | — | 0.00% | ok | ko | ko | ko |

Performance Regarding the Chemical Resistance of Tested Coatings

Resistance to acid: the coatings prepared following examples 1 and 2 and in the comparative example 1 were subjected to chemical immersion at room temperature in a aqueous solution of HCl 0.1 mol/L. The samples are not completely immersed in the solution in order to have a non-immersed area used as reference. After immersion, the samples are rinsed with deionized water and let at room atmosphere for drying.

Resistance to alkali: the coatings prepared following examples 1 and 2 and in the comparative example 1 were subjected to chemical immersion at room temperature in a aqueous solution of NaOH 0.1 mol/L. The sample are not completely immersed in the solution in order to have a non-immersed area used as reference. After immersion, the samples are rinsed with deionized water and let at room atmosphere for drying.

For both tests (resistance to acid and resistance to alkali), the evaluation is done by observation of the sample under an artificial sky to determine whether discoloration/punctual delamination/defects can be observed on the sample. If the appearance of the immersed area is distinguishable from the non immersed area, the sample is considered as "ko", meaning not having good resistance to the considered medium (acid or alkaline). If there is no difference between the immersed area and the non-immersed area, the coating is considered as "ok", meaning having good resistance to the considered medium (acid or alkaline).

| Samples | Doping material | % Dry extract of doping material | Immersion HCl 4 hours | Immersion HCl 24 hours | Immersion HCl 48 hours | Immersion NaOH 4 hours | Immersion NaOH 24 hours | Immersion NaOH 48 hours |
|---|---|---|---|---|---|---|---|---|
| Ex. 1 | Bi | 0.11% | ok | ok | ok | ok | ok | ok |
| Ex. 2 | Ce | 0.10% | ok | ok | ok | ok | ok | ok |
| Comp. Ex 1 | — | 0.00% | ok | ko | ko | ko | ko | ko |

Performance Regarding the Humidity Resistance of Tested Coating

The samples prepared following examples 1 and 2 and in the comparative example 3 were exposed to high humidity environment in a close humid chamber at 40° C. and 95% relative humidity following the standard EN1096-2.

| Samples | Doping material | % Dry extract of doping material | Exposure 1 days | Exposure 2 days | Exposure 5 days | Exposure 10 days | Exposure 20 days |
|---|---|---|---|---|---|---|---|
| Ex. 1 | Bi | 0.11% | ok | ok | ok | ok | ok |
| Ex. 2 | Ce | 0.10% | ok | ok | ok | ok | ok |
| Comp. Ex1 | — | 0.00% | ok | ko | ko | ko | ko |

Performance Regarding Mechanical Resistance of Tested Coatings on PVD Low-e Coated Glass Substrate The coatings prepared in examples 3, 4 and 5 and comparative examples 2 and 3 were subjected to an automatic wet rub test according to the standard EN1096: a flat circular teflon head covered with a cotton cloth is dragged on the coating with a constant, built-in load. The abrasion of the cotton over the coated surface will damage (remove) the coating after a certain number of cycles. The cotton should be kept wet with deionised water during the whole duration of the test. The speed should be adjusted between 60 and 90 full oscillations (back and forth)/minute. The evaluation is done by observation of the sample under an artificial sky to determine whether discoloration/scratches can be seen on the sample. If the appearance of the abraded area is significantly distinguishable, the sample is considered as "ko" meaning not having good mechanical resistance. If there is a slight difference in coloration without delamination of the coatings and without scratches on the coating, the coating is considered as "acceptable", meaning having an improved mechanical resistance. If there is no difference between the abraded area and the non-abraded area, the coating is considered as "ok" meaning having good mechanical resistance according to the invention. The test results are summarized in Table 2 and 3:

TABLE 2 evaluation of abrasion resistance of various SiO2 coatings on PVD low-e coated (Planibel AS) samples after n rubbing cycles

| Samples | Doping material | % Dry extract of doping material | 500 cycles | 1000 cycles |
| --- | --- | --- | --- | --- |
| PVD low-e coated glass substrate coated with sol-gel coating of Ex. 3 | Bi | 0.14% | ok | ok |
| PVD low-e coated glass substrate coated with sol-gel coating of Comp. Ex 2 | — | — | ko | ko |
| PVD low-e coated glass substrate without sol-gel coating | — | — | ko | ko |

TABLE 3 evaluation of abrasion resistance of various SiO2 coatings on PVD low-e coated (Smart 51) samples after 1000 rubbing cycles

| Samples | Doping material | % Dry extract of doping material | 1000 cycles |
| --- | --- | --- | --- |
| PVD low-e coated glass substrate coated with sol-gel coating of Ex. 4 | Bi | 0.14% | ok |
| PVD low-e coated glass substrate coated with sol-gel coating of. Ex 5 | Ce | 0.49% | acceptable |
| PVD low-e coated glass substrate coated with sol-gel coating of Comp. Ex 3 | — | — | ko |

The results in Tables 2 and 3 show the performances improvement obtained with coatings doped with cerium or bismuth. Table 3 further shows that the improvement is more significant with bismuth even when used at a lower content.

The invention claimed is:

1. A process to increase the mechanical and chemical resistance of a hydrolyzable network-forming silica gel coating on a surface of a glass sheet, the process comprising:
    forming a low-e undercoating by PVD on the surface;
    applying a coating composition comprising a hydrolyzable, network-forming silica gel doped with a precursor of bismuth or cerium oxide to the surface comprising the undercoating, and
    subsequently heat treating the glass sheet at a temperature of from 530° C. to 730° C. or chemically tempering the glass sheet,
    wherein the hydrolyzable, network-forming silica gel doped with a precursor of bismuth or cerium oxide is a topmost coating throughout the heat treating.

2. The process according to claim 1, wherein the precursor of bismuth or cerium oxide is present between 0.4 to 5%, based on the percentage in weight of the coating.

3. The process according to claim 1, wherein the coating covers the entire or substantially the entire surface of the glass sheet.

4. The process according to claim 1, further comprising: heating the glass sheet after the glass is coated.

5. The process according to claim 1, wherein the coating composition comprising a hydrolyzable, network-forming, silica gel is doped with a precursor of bismuth oxide.

6. The process according to claim 1, comprising chemical tempering of the coated glass sheet.

7. A glass sheet, obtained by the process according to claim 1.

8. The glass sheet according to claim 7, wherein the glass sheet is heat treated.

9. The glass sheet according to claim 8, wherein the glass sheet is a tempered glass.

10. A shower door, table or display comprising the glass sheet according to claim 8.

11. A process for forming a coated glass sheet, comprising:
    forming a low-e PVD undercoating on the glass sheet;
    applying a coating composition comprising a hydrolyzable, network-forming silica gel doped with a precursor of bismuth oxide on the PVD undercoating, and
    subsequently heat treating the glass sheet at a temperature of from 530° C. to 730° C. or chemically tempering the glass sheet,
    wherein the precursor of bismuth is present between 0.4 to 5%, based on the percentage in weight of the coating.

12. The process according to claim 11, further comprising:
    heating the glass sheet after the glass is coated.

13. The process according to claim 11, comprising chemical tempering of the coated glass sheet.

14. The process according to claim 11, wherein the hydrolyzable, network-forming silica gel doped with a precursor of bismuth oxide is a topmost coating throughout the heat treating.

15. A glass sheet, obtained by the process according to claim 11.

16. The glass sheet according to claim 15, wherein the glass sheet is heat treated.

* * * * *